United States Patent [19]

Zofan

[11] Patent Number: 4,653,093

[45] Date of Patent: Mar. 24, 1987

[54] FREQUENCY SELECTIVE RINGER CIRCUIT

[75] Inventor: Ely S. Zofan, Reynoldsburg, Ohio

[73] Assignee: Floyd Bell Associates, Inc., Columbus, Ohio

[21] Appl. No.: 759,462

[22] Filed: Jul. 26, 1985

[51] Int. Cl.$^4$ ............................................ H04M 1/00
[52] U.S. Cl. .................................... 379/386; 379/180; 328/138
[58] Field of Search ............ 179/84 SS, 84 VF, 84 T, 179/84 R; 328/138; 307/522, 523, 524

[56] References Cited

U.S. PATENT DOCUMENTS

4,273,965  6/1981  Cowpland et al. ............ 179/84 VF

Primary Examiner—James L. Dwyer
Attorney, Agent, or Firm—Mueller and Smith

[57] ABSTRACT

A frequency selective ringer circuit which utilizes a constant current source in conjunction with an array of resistors and switches for developing a frequency selective window with which to detect an incoming frequency at the tip and ring inputs of a telephone system. The incoming frequency is doubled and converted to a d.c. level which is utilized as the converted level which is evaluated by the circuit. Where the converted voltage level falls within the established window, a drive circuit is energized for actuating a transducer such as a piezoelectric crystal or loudspeaker. Frequency selection is made by the simple expedient of closing one of a plurality of SPST switches. The circuit also may include a circuit for automatically deactivating the mechanical bell of an existing telephone set without the removal thereof.

20 Claims, 5 Drawing Figures

FREQUENCY SELECTIVE RINGER CIRCUIT

BACKGROUND

Telephone service to a highly significant number of customer-users is supplied by telephone companies on a party-line basis. Such multiple customer usage of a singular line of communication is particularly prevelant in small towns, as well as in rural areas and the like where line distances from a switching station to individual telephone users are of extensive length.

Because of the power losses necessarily encountered with such lengthy transmission lines, the number of customers served or parties available to a given party line is limited, particularly with respect to the number of telephone instrument ringer components involved. The latter components perform in conjunction with a ringing system, the basic function of which is to ring a called party, give ring-back tone to the calling party, and halt ringing the ring-back tone when the call is answered or abandoned. The called party's ringer component is driven from alternating current ringing generators and in the present-day approach to telephone design, the ringer components are designed to ring only over certain frequency and voltage ranges.

Such multi-frequency ringing systems serve to replace "coded" (short-long, etc.) ringing on multi-party lines. Typical ringer components are structured as mechanically actuated bells having a clapper of selected spring bias and ring frequency sensitizing components including a capacitor-inductor arrangement which provides a frequency tuned clapper drive response. Generally, a sequence of predetermined frequency levels is utilized by the telephone companies to carry out ringing to a given party on a party line. Commonly, five distant frequencies are employed in allowing individual party ringing for up to five parties on a given line with bridged ringing and up to ten parties with divided ringing. Harmonic, decimonic and synchromonic series ringing systems generally are employed in the telephone service industry. The harmonic series are 16.6, 25, 33.3, 50, and 66.6 Hertz. Decimonic series are provided as 20, 30, 40, 50 and 60 Hertz, while the synchromonic series are 16 (or 20), 30, 42, 54, and 66 Hertz. Telephone service companies commonly carry 12 telephone models in their repertory which will be capable of responding to 12 different ringing frequencies. As is apparent, such an arrangement requires the provision of 96 items in inventory, which from a business standpoint, is less than a desirable requirement.

Telephone service companies also have experienced a wide range of difficulties with the ringer components of ringing systems, particularly with respect to frequency selective ringers. A satisfactory ring by one of these components is usually considered as a steady two-gong ring or a certain level of sound output expressed in dBrap. A small change in input frequency can cause a considerable increase in minimum voltage required for a ring. At some point in an altering frequency, the ringer component will not respond, even at maximum ringing voltage. Because of the nature of the delivery systems from switching stations, distortion or deviation from a proper sinusoidal input will affect the performance of the ringers. While a frequency selective ringer component will perform at a particular input frequency, as this frequency is increased or decreased, a higher voltage is needed to produce a comparable ring. In effect, the difficulty in maintaining frequency selectivity, and the loads imposed by the mechanical ringers importantly limit the number of parties which are available on any given line. Ringer components constitute the major part of this ringing load or power demand. Further, achieving desired frequency selectivity on the part of ringers on an efficient high volume production basis has been an elusive goal of industry. The mechanical bell ringers have been subject to very high reject rates even before their installation within telephone sets. Part of this rejection difficulty involves the carrying out of tuning procedures with the coils and capacitors operatively associated in a typical mechanical bell ringer device. To the present time there are no electronic ringers which are frequency selective in performance perhaps due to requirements for a stable performance and a capability for repeating in response to frequency inputs on a regular basis from unit to unit. The ringers also are prone to other operational difficulties. For example, ringers have a sensitivity to 20 Hertz ringing appear prone to exhibit a phenomena known in the industry as "dial tap". Dial tap results from the spike from the collapsing magnetic field of the pulsing relay of the system and causes a "ding" with each dial pulse and/or with disconnect. To overcome a dial tap condition, the above-noted spring bias of the clappers of ringers is stiffened with the expected result that higher power is required to cause proper ring.

From the foregoing it will be apparent that a frequency selective ringer circuit which exhibits very low power consumption while a remaining highly discriminating with respect to frequency inputs would be of particular utility to the industry. Of further interest to the telephone service industry would be such a ringer circuit or component which could be accurately tuned for any of the above ranges of frequency response by the simple expedient of closing a switch. Such a simplified tuning procedure will eliminate the difficulties encountered in attempting the tuning of current mechanical bell systems. Further, industry will be receptive to such devices where they can be installed by the customer without resort to telephone company labor input.

SUMMARY

The present invention is addressed to a frequency detector circuit and frequency selective ringer circuit which, while exhibiting advantageously low power consumption, are highly frequency selective and readily installed within existing telephone systems. Frequency selection adjustment by the installing entity is carried out through the simple expedient of throwing a switch.

In one embodiment of the invention, the frequency selective ringer circuit is combined with a rectifier arrangement which responds to the signal input of a telephone line and which is easily connectible with the mechanical bell ringer circuit connections of an existing telephone having a mechanical bell ringer. This procedure effects the disablement of the mechanical ringer and implements the use of the lower power consumption circuit of the invention which operates with a lower power consumption solid state or loudspeaker type audio device.

Another feature of the invention is to provide a frequency detector circuit for deriving an output in response to a signal input of predesignated frequency which includes a signal treating arrangement which responds to the signal input for providing a substantially constant current output. A frequency selective network then is provided which is responsive to the constant current output and which is adjustable in correspondence with the predesignated frequency for deriving first and second voltage level signals respectively representing frequency values above and below the predesignated frequency. A converter network is provided which responds to the signal input for deriving a converted voltage level signal corresponding therewith and a comparator function is positioned within the circuit to respond to the first and second voltage level signals for deriving a frequency identification output when the converted voltage level signal is of value intermediate the values of the first and second voltage level signals.

Another feature of the invention is to provide a frequency selective ringer circuit for deriving an output in response to a signal input of predetermined ring frequency which includes a rectifier which receives the signal input and derives a rectified signal. A frequency doubling network is coupled with the rectifier for deriving a first signal having a frequency substantially double that of the signal input. This doubled frequency is submitted to a first converter which responds thereto to derive a second signal exhibiting substantially constant pulse duration. A second converter then responds to the second signal for deriving a converted voltage level signal corresponding with the frequency of the second signal. Signal treatment means are provided which respond to the rectified signal for providing a substantially constant current output. This constant current output then is utilized by a frequency select network which responds thereto and is adjustable in correspondence with the predesignated frequency for deriving first and second voltage level signals defining frequency value limits respectively above and below the predesignated frequency. A comparator is provided which responds to the first, second and converted voltage level signals for deriving a frequency responsive output when the converted voltage level signal is of a value intermediate the limit values of the first and second voltage level signals.

Another feature of the invention is to provide a frequency selective ringer circuit for use in conjunction with telephone sets responsive to a signal input of predesignated frequency and which has connections to a capacitor containing a mechanical bell ringer circuit. The circuit includes a first rectifier which responds to the signal input and which is connectible with the mechanical bell ringer circuit connections for effecting the disablement thereof by charging the capacitor of that assemblage. A signal treatment circuit is provided which includes a second rectifier which responds to the signal input for providing a substantially constant current output. This constant current output is utilized by a frequency select network which responds thereto and which is adjustable in correspondence with the predesignated frequency to derive first and second voltage level signals defining frequency value limits respectively above and below the designated frequency. A frequency doubling network is provided which is coupled with the second rectifier and derives a first signal having a frequency substantially double that of the signal input. A first converter network responds to the first signal for deriving a second signal exhibiting substantially constant pulse duration and a second converter responds to the second signal for deriving a converted voltage level signal corresponding with the frequency of the second signal. A comparator provides response to the first, second and converted voltage level signals to develop a frequency responsive output when the converted voltage level signal is of value intermediate the limit values of the first and second voltage level signals. The circuit includes an audio transducer such as a piezoelectric crystal or loudspeaker which is energizable to produce an audible signal and a circuit is provided which responds to the frequency responsive output of the comparator to effect the energization of that audio transducer.

Other features and objects of the invention will, in part, be obvious and will, in part, appear hereinafter.

The invention, accordingly, comprises the apparatus and system possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION

Figure 1:
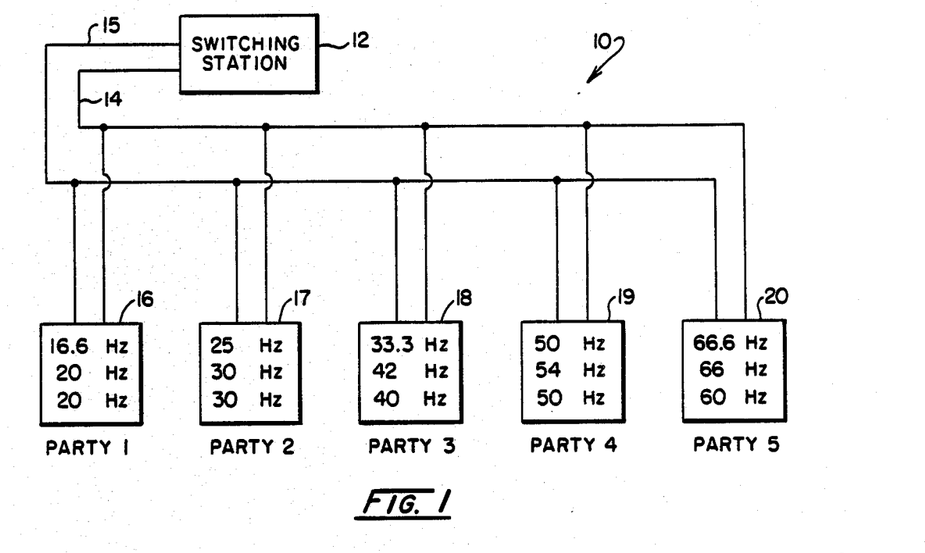
FIG. 1 is a block schematic diagram of a telephone party line.

Referring to FIG. 1, a highly schematic presentation of a party line form of telephone system providing for frequency selective ringing is revealed generally at 10. The system 10 is shown having a switching station represented at block 12 from which distribution lines as at 14-15 extend carrying conventional tip and ring line containing information, including ringing signals and talk signals, to a number of parties within the distribution system, as are represented at the five blocks 16-20. Each of the blocks 16-20 represents a party, as labeled respectively "Party 1-Party 5" and will contain a telephone set having a ringer which will respond to a party designated ring signal frequency. To avoid interfering ringing from party to party, the frequencies assigned to each party are spaced in accordance with, for example, three conventional sequences as indicated above, the series of spaced frequencies may be Harmonic involving the labeled upper level 16.6 Hz-66.6 Hz; Synchromonic series ranging from 16 (or 20) through 66 Hertz; or Decimonic series ranging from 20 Hz-60 Hz.

The telephone utility company generally will elect one of these series to provide for ring frequency discrimination from party to party and, inasmuch as conventional mechanical ringer devices constitute a very significant portion of the load of the entire system 10, generally the number of parties is limited to, for example, about five for any given distribution line 14-15. In the production of the ringer devices, each of the coil-capacitor containing ringer components must be tuned to the elected frequency, a task which has been found to be labor intensive. The ringer components for each of the telephone sets at blocks 16-20 also must be capable of performing under variations of voltage as well as in conjunction with ring signals evidencing distorted sine-wave characteristics and the like.

Figure 2:
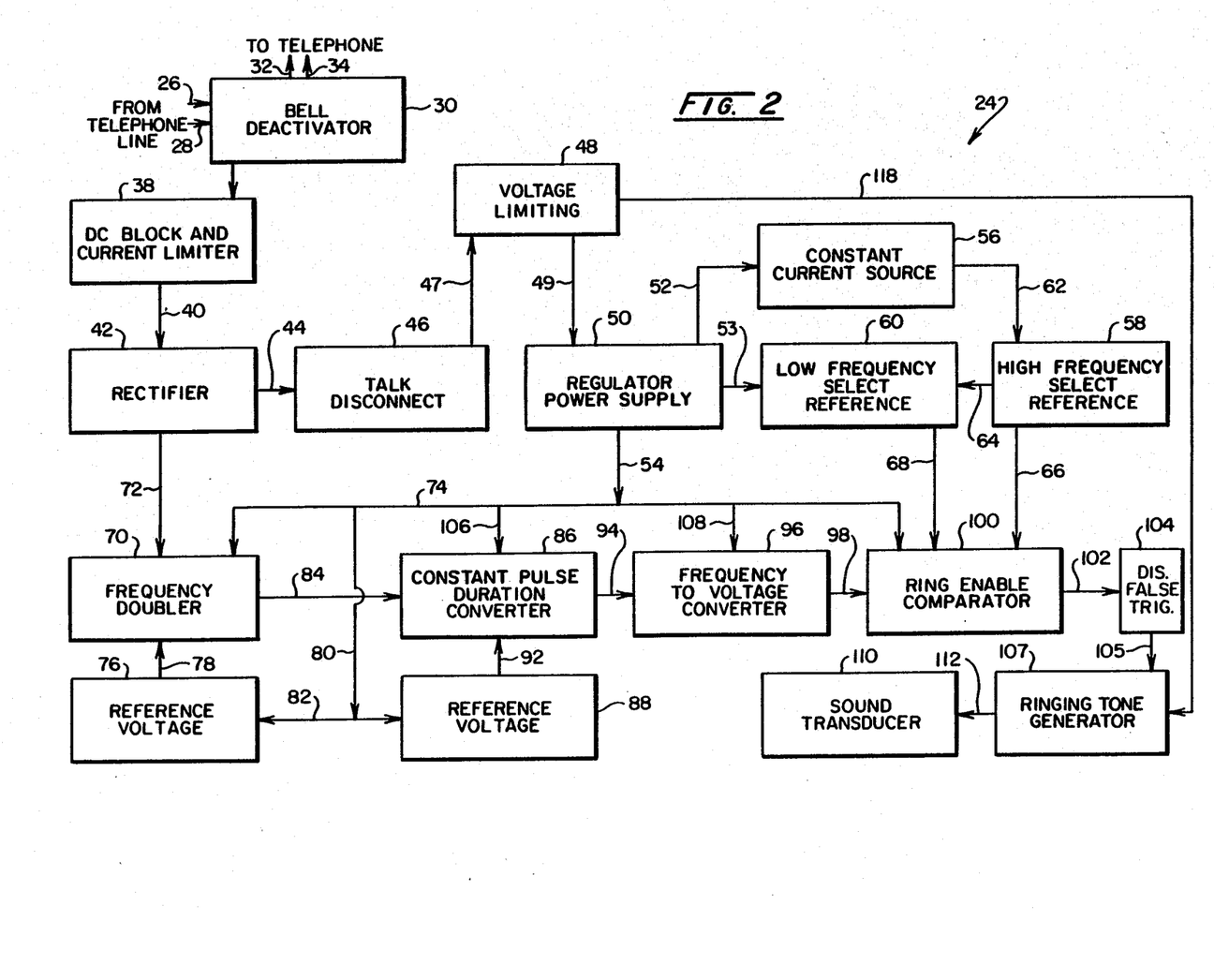
FIG. 2 is a block diagram of the detector circuit of the invention.

Referring to FIG. 2, a schematic, block diagrammatic representation of a detector circuit for providing a frequency selective bell ringer function is represented at 24. This circuit 24 permits the election of any one of the 12 frequencies of the three series thereof described in conjunction with FIG. 1 by the simple expedient of a switch actuation, while providing adequate frequency discrimination between any of the 12 selected frequencies. Of further importance, the circuit performs with high reliability while exhibiting significantly reduced load demands and can be installed with ease to the extent that existing telephones may be retrofitted with the circuit by the customer without intervention of telephone utility personnel. In the instant figure, the dual tip and ring leads shown, respectively, at 26 and 28 are directed to the input of a bell deactivator function represented by block 30. Deactivator function 30 is coupled, as represented by lines 32 and 34, to the consumer's telephone set utilizing the conventionally accessible green and red leads in the set and serves to convert the a.c. components otherwise utilized to drive the coil-capacitor type mechanical bell ringing circuit into a condition wherein the capacitive function thereof is fully charged for any given ring and the mechanical bell is deactivated without resort to more detailed retrofit procedures. The consumer may make the connection and the circuit 24 may be utilized in a mode external to the telephone set itself. With the deactivator 30 in place, the high load demand mechanical bell function is dispensed with. Of course, for purposes of utility company retrofitting of telephone sets or in the production of original equipment, the deactivator function 30 is not utilized with the instant system.

The tip and ring functions as represented at lines 26 and 28 additionally are directed as represented by line 36 to a direct current blocking and current limiting function as represented at block 38, such function being conventional in telephone ringing circuits. From this function as represented at block 38, as represented at line 40, the tip and ring signal inputs are directed to the input of a signal treatment arrangement commencing with a full wave bridge rectifier represented at block 42. The rectified signal from rectifier function 42 is provided at line 44 which is directed to the input of a talk disconnect function represented at block 46. Conventionally provided as a Zener diode or the like, the talk disconnect function serves to isolate the ringing function from the lower level talk or conversational signals within the telephone distribution line which occur subsequent to a ringing function. See Bush et al., U.S. Pat. No. 4,214,131, issued July 22, 1980. The output of the talk disconnect function at block 46 at line 47 is directed to the input of a voltage limiter function represented at block 48. Upon being appropriately limited to acceptable values, the resultant voltage signal at line 49 is introduced to a power supply regulator represented at block 50. This voltage limiter function represses high voltage spike type phenomena as might be caused by lightning or the like. The power supply regulator function provides selectively lowered and controlled voltage outputs, for example in the range of about 15½ volts at its various output lines 52–54. This substantially constant voltage output is utilized as a controlled power supply essentially for the entire circuit. Generally, the input voltage upon which the power supply function 50 operates is at about the 60 volt level, however, this level will vary somewhat significantly in practice.

The controlled voltage level output at line 52 is shown directed to the input of a constant current source represented at block 56. This constant current source, representing the last component of the signal treatment grouping, provides a stable current at a predetermined level which is introduced to a frequency select network function including a high frequency select reference network represented at block 58 and a low frequency select reference network represented at block 60. In this regard, note that the constant current source output as represented at line 62, extends to the high frequency select reference function 58. The output from the latter function is present at line 64 leading to the low frequency select reference at block 60. This high frequency select reference function at block 58 provides an adjustable frequency selection by the manual actuation of one of an array of switches which, in turn, select a voltage level signal corresponding with a frequency slightly elevated above the predesignated frequency by which the circuit is to operate. This signal is presented along line 66. Correspondingly, the low frequency select reference responds to the high frequency select level signal at line 64 and provides a voltage level signal just below the predesignated frequency at line 68, these voltage level signals providing frequency value limits respectively above and below the predesignated ring frequency. Thus, a form of "window" is developed providing upper and lower limits for the reception of an input signal having a frequency characteristic within the acceptable tolerances of the system corresponding to the predesignated frequency of the input signal. These signals representing a "window" form of evaluation then are compared with voltage levels representing the actual signal received.

Enhanced frequency discrimination between adjacent frequencies selected by the instant circuit is achieved by the doubling of all of the frequency values established by industry for the purpose of carrying out selection. Accordingly, the circuit 24 includes a frequency doubler function which acts upon the signal input from telephone lines 26 and 28. Normally, the doubling of a frequency generated from a sinusoid input signal which is not necessarily consistent or stable becomes a complex matter. However, with the approach of the instant circuit, these noise or distortion occasioned difficulties are accommodated for. The frequency doubler function of the circuit is represented at block 70 and operates in conjunction with each half-cycle of the sinewave input to the rectifier function as represented by line 72. Power is supplied to the doubler function from the regulator power supply function represented at block 50 via lines 54 and 74. The frequency doubler function at block 70 operates in conjunction with a comparator stage which receives a reference voltage from a reference voltage network represented at block 76 via line 78. This reference voltage function represented at block 76, in turn, is powered from the regulator power supply 50 via lines 54, 74, 80 and 82. Because of the nature of the input signals to the system, the output of the frequency doubler function represented at block 70 at line 84 is one which may be represented as a pulse train exhibiting a variation in duty cycle which is occasioned by the corresponding voltage amplitude variations which are exhibited by the input ringing signal. Accordingly, the pulse train at line 84 is directed to a constant pulse duration converter represented at block 86. This function at block 86 serves, in effect, to carry out a differentiation of the signal entering from line 84 and utilizes another comparator stage which receives a reference voltage from a network represented at block 88 through line 92. The voltage network represented at block 88 is powered from lines 80 and 82 which, in turn, extend to the regulator power supply represented at function block 50 through lines 54 and 74. By so differentiating the pulse train entering from line 84, the constant pulse duration converter function at block 86 serves to ameliorate the effects of the earlier-described input voltage amplitude variations and the resultant output provides frequency defining pulses of constant width and amplitude at line 94 which extends to the input of a frequency to voltage converter represented at block 96. The latter function serves to develop a converted voltage level signal corresponding with a doubling of the value of frequency of the input to the circuit 24 from the telephone line. This voltage level is asserted from along line 98 to a ring enable comparator function represented at block 100 which carries out an operation wherein the "window" as defined by the limiting voltage levels at lines 66 and 68 is compared with the converted voltage level signal emanating from line 98. In the event that the signal level derived from line 98 falls within the limits established from lines 66 and 68, then a frequency responsive output is derived at line 102 which is directed to the input of a ringing tone generator represented at block 104. Comparator network 100 is shown receiving power from regulator power supply 50 through lines 54 and 74, while functions or networks represented at blocks 86 and 96 are powered, respectively, through the same lines from respective lines 106 and 108.

The frequency responsive output of comparator 100 is treated to assure elimination of false triggering phenomena, as represented by block 104 and line 102. A thus treated output at line 105 provides an enabling signal for introduction to a ringing tone generator represented at block 107.

Ringing tone generator function 107 thus is enabled to drive a sound transducer such as a piezoelectric transducer or a conventional pm speaker, as is represented at block 110, from line 112. To provide the higher voltage levels required for this driving function, the ringing tone generator function 107, in turn, is powered from the higher voltage available from the voltage limiting function at block 48 as derived from line 118.

Figure 3A:
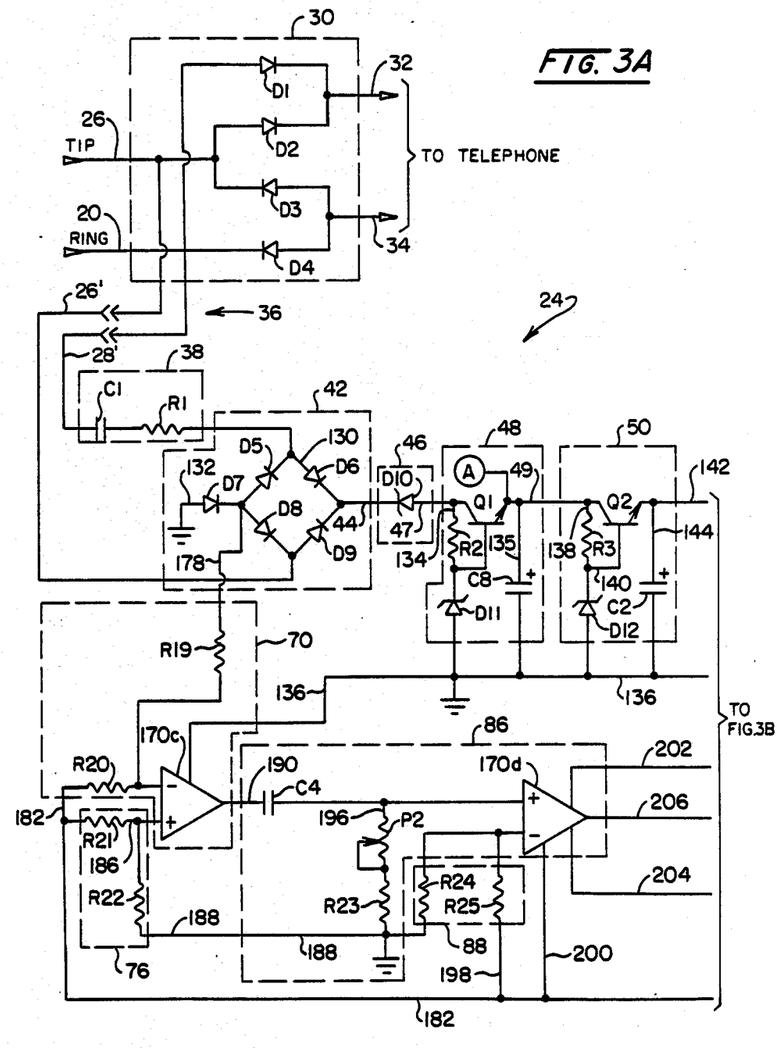
FIGS. 3A and 3B, when combined, provide a schematic diagram of the detector circuit of the invention.
Figure 3B:
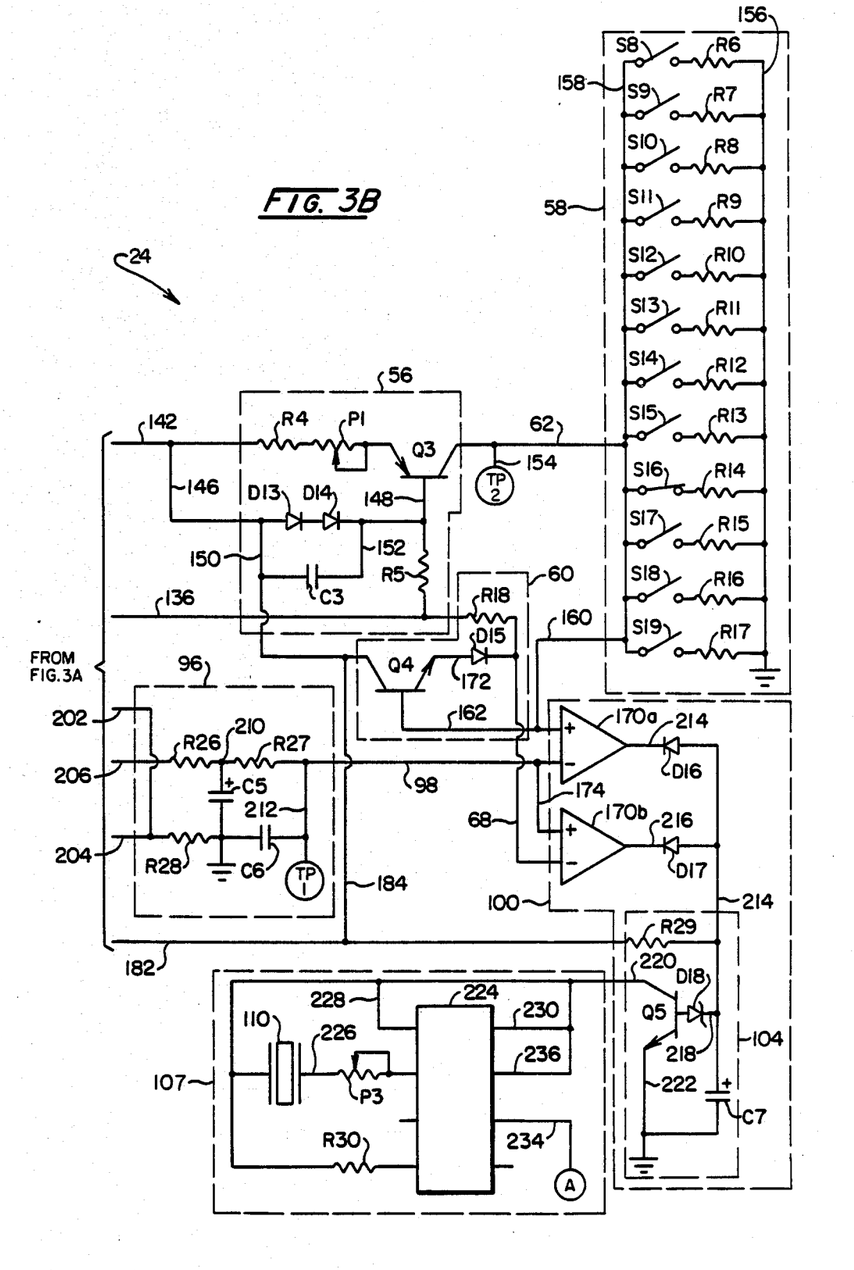

Referring to FIGS. 3A and 3B, a more detailed representation of the components of the detector apparatus is revealed. Referring to FIG. 3A, the bell deactivator function again is represented at 30 within a dashed boundary. The tip and ring line inputs shown, respectively, at 26 and 28 are shown being directed to a full-wave bridge assemblage including diodes D1 through D4. With the arrangement shown, output line 32 from diodes D1 and D2 and output line 34 from diodes D3 and D4 carry a rectified signal. Thus, by connecting line 32 to what is conventionally known as the "red" wire of a telephone, and coupling line 34 to the "green" line thereof, the capacitor component of a mechanical bell ringer will be charged and not discharged to effect an disablement thereof without resort to removal procedures or the like.

The tip and ring line inputs, of course, can be used with or without the bell deactivator arrangement at 30. Accordingly, a double connection is shown between the deactivator 30 and the remainder of the circuit 24, the tip and ring inputs now being shown, respectively, at 26' and 28'. Input 28' is shown being directed to the d.c. block and current limiter function described earlier at block 38 and represented in dashed boundary fashion. A d.c. block is provided by a capacitor C1 which, for example, may be provided as a one microfarad, 250 volt variety. The current limiting function is provided by a resistor R1 which, typically is provided as a 1.0K ohm, ½ watt variety.

The output of the d.c. blocking and current limiting function 38 at line 40, as well as tip input 26' are coupled to the inputs of a fullware bridge rectifier 130 comprised of diodes D5 through D9. Rectifier 130 is shown coupled to ground through line 132 which contains diode D7, and provides a rectified output or signal at line 44. This output will vary in terms of voltage levels depending upon the particular telephone system at hand however, about a 68 volt value is typically encountered. Line 44 is directed to the cathode of a Zener diode D10 which may be of type IN753 and serves a talk disconnect function as described in conjunction with block 46 in FIG. 2. The diode D12 serves a blocking function in conjunction with the lower level voltages encountered when the telephone is used in a message transmission and reception mode as opposed to a ringing mode.

The output of the talk disconnect function 46 is directed through line 47 to line 134 of the earlier-described voltage limiter network 116 which is represented as a dashed boundary in the instant figure. Line 134 is shown extending from line 47 to ground line 136. The voltage limiter includes a Zener diode D11 which may be provided, for example as a type IN4759, as well as a resistor R2, the combination serving to protect the circuit against high voltage spikes which may be encountered. Also incorporated within the limiter function 116 is an NPN transistor function Q1, the base of which is coupled to the junction between diode D11 and resistor R2, the collector of which is coupled to line 47 and the emitter of which is coupled to terminal A and line 49. Transistor function Q1 preferably provided as a Darlington coupled pair, is utilized as a power supply for ringing components of the circuit as described in conjunction with block 107 in FIG. 2.

The earlier-described regulator power supply function is represented in FIG. 3A by the dashed boundary 50. An initial regulation of the power supply at function 50 is provided by a combination of resistor R3 and diode D12 which are coupled within line 138 between lines 49 and 136. The initial regulated voltage at line 138 is tapped at line 140 to provide a consistent maximum voltage input to the base of NPN transistor Q2. The collector of transistor Q2 is coupled to line 49, while the emitter thereof is coupled to line 142. A capacitor C2 is connected within line 144 between lines 142 and 136 for filtering purposes. Capacitor C2 may have a rating of 100 microfarads and 25 volts, while transistor Q1 may, for example, be provided as a type 2N555 resistor R3 may be selected having a 22 kiloohm rating; and diode D12 may be provided as a 3 volt type.

Looking additionally to FIG. 3B, line 142 along with connecting line 146 are shown being directed to the input of a constant current source network as earlier describe and represented within dashed boundary 56. The constant current network includes a PNP transistor Q3, the base of which is coupled through lines 146 and 148 to diode pair D13 and D14 which are series coupled to the controlled power supply at line 142. A resistor R5 is coupled within line 148 which, in turn, extends to ground line 136. With the arrangement shown, the junction between the cathode of diode D14 and line 148 will be about 1.2 volts below the power supply at line 146. A one microfarad, 16 volt tantalum capacitor C3 is coupled across the diodes D14 and D14 by line 150 and 152 for filtering any noise so as to provide a constant current flow across transistor Q3. This current output is present at line 62 and may be controlled by an impedance adjustment at current limiting resistor R4 and potentiometer P1. Accordingly, there is provided a selectively and accurately controlled current output at line 62 which may be monitored at a test point, TP2 extending from line 62 via line 154.

The controlled constant current developed from the constant current source 56 at line 62 is directed to a parallel array of resistors R6-R17. One end of each of the resistors R6-R17 is coupled through a common line 156 to ground, while the opposite ends thereof are coupled through respective SPST switches S8-S19. Switches S8-S19, in turn, are coupled through line 158 to line 162 carrying the above-discussed constant current output of network 56. The array of switches S8-S19 and associated resistors R8-R19 comprise the earlier-noted high frequency select reference function 58 as represented by the dashed boundary surrounding them. The values of the resistors are selected such that by closing a given switch, for example switch S16, the resultant completed circuit will develop a voltage level value corresponding with a predesignated high end frequency value limit. In this regard, the voltage level representing this upper value of the selected frequency will be present at line 160 extending from line 158. As described and labeled in connection with FIG. 1, there are generally considered to be 12 frequency values which can be selected for the three frequency spacing series generally selected for party line telephone installations. Table I below provides a listing of the designated frequency levels described in connection with FIG. 1 along with the resistor designations R8-R19 and the resistance values which may be utilized to achieve a high limit level for carrying out a selective ring output in correspondence with a designated frequency ring input signal.

TABLE I

| Frequency-Hz | Resistor | Resistance-Kohms |
|---|---|---|
| 16.6 | R6 | 8.25 |
| 20 | R6 | 9.6 |
| 25 | R8 | 9.5 |
| 30 | R9 | 13.7 |
| 33.3 | R10 | 15 |
| 40 | R11 | 107.6 |
| 42 | R12 | 19 |
| 50 | R13 | 21.85 |
| 54 | R14 | 23.6 |
| 60 | R15 | 25.9 |
| 66 | R16 | 28.6 |
| 66.6 | R17 | 29 |

The voltage level signal at line 160 is directed to line 162 and thence to the positive input of one stage 170a of a quad comparator having a general designation 170. The opposite input to comparator stage 170a will be seen to be the d.c. voltage signal (converted voltage level) earlier described at line 98 which is reproduced in FIG. 3B.

The lower frequency value limit to which the circuit 24 will respond is established by the earlier-described low frequency select reference network which is represented in FIG. 3B within dashed boundary 60. Network 60 develops a voltage level signal having a value about one volt below that developed at line 160. This signal level is achieved by providing an NPN transistor Q4, the base of which is coupled to line 162 carrying the voltage level developed at line 160. The collector of transistor Q4 is coupled to line 150 extending from line 146 of the constant current source network 56. This line carries a regulated voltage supply of about 12 volts. The emitter of transistor Q4 is coupled to line 172 which carries a diode D15 and extends to line 68. Line 68, in turn, extends through resistor R18 to ground line 136 as well as to the negative input of a second comparator stage 170b. The opposite or positive input to comparator stage 170b is derived from line 174 which is coupled to the earlier-described line 98 carrying a d.c. signal or converted voltage level corresponding with the received ring signal frequency. The base emitter drop and the voltage drop experienced at diode D15 provides the desired lower voltage level limit for establishing the window evaluating the signal received from line 98. Quad comparator 170 may, for example, be a quad programmable comparator marketed, for example, by Motorola, Inc. as a type MC14574, a device using complementary-channel and n-channel enhancement MOS devices in a single monolithic structure which exhibits low power consumption.

Returning to FIG. 3A, the frequency doubler network described in conjunction with block 70 in FIG. 2 again is represented within a similarly numbered dashed boundary. Functioning to provide an enhanced discrimination between adjacent frequencies of any of the elected series, the doubling operation is achieved by tapping the fullwave bridge 130 at the common junction of diodes D5, D7 and D8 with line 178. Diodes D5, D7 and D8 provide a clamping function which serves to establish about a 0.6 volt differential between line 178 and ground. With the connection shown, each of the half-wave excursions of a given cycle input to bridge structure 138 is utilized to develop a doubled frequency output within a form of summing circuit comprised of line 178 and the resistors R19 and R22 respectively positioned therein. The output of the summing circuit is connected through line 182 with the negative input of another stage, 170c, of the quad comparator grouping 170. Line 182 incorporates a resistor R20 and is coupled with line line 184 (FIG. 3B) to the regulated power supply emanating from line 146. Thus, the input at line 182 is the summation of the d.c. level at resistor R20 and the two half-wave components at line 176 and 178. Bridge diode D7 exhibits the noted forward drop of about 0.6 volt and function to prevent the tapped half-wave signals at line 178 from reaching a zero cross-over resulting in a negative excursion. Such a latter condition would jeopardize comparator stage 170c.

The opposite or positive input to comparator stage 170c is developed from a reference voltage network described earlier in conjunction with block 76 and shown within a dashed boundary of the same numeration in FIG. 3A. The reference network includes a resistor R21 within line 186 extending from the regulated supply at line 182 to the input of the comparator stage 170c and a resistor R22 within line 188 extending from line 186 to ground.

Figure 4:
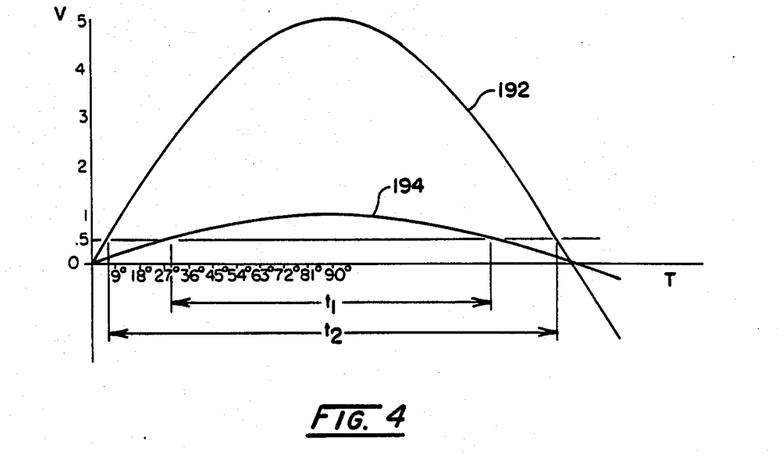
FIG. 4 is a graph showing input voltage amplitude variations encountered in telephonic installations.

As indicated earlier herein, the pulse form at line 190 is one wherein pulse width and amplitude will be variable in correspondence with the voltage amplitude variations of the incoming signal. These variations will be witnessed from installation to installation. Looking momentarily to FIG. 4, a typical variation for such a signal is represented by the two signal curve 192 and 194.

When operating in conjunction with comparator stage 170c, and output pulse duration at line 190 corresponding to time $t_2$ will result from an amplitude represented at curve 192. On the other hand, where lower amplitudes of voltage are encountered as represented at curve 194, a different pulse width at line 190 as represented at $t_1$ will be witnessed. Accordingly, the constant pulse duration converter network as described in conjunction with block 86 is provided which is represented within dashed boundary 86 in FIG. 3A. Returning to FIG. 3A, the varying signal output at line 190 is treated by a differentiation network including capacitor C4 in line 190 and the impedance represented by resistor R23 and potentiometer P2 present within line 196 extending from line 190 to ground line 188. Capacitors C4 may, for example, be provided as a 0.1 microfarad polyester capacitor, such selection being predicated upon desire for providing temperature stability and potentiometer P2 may be adjusted to achieve the desired pulse width of the waveform developed at line 190. As a result of signal treatment at network 86, a series of short pulses of constant amplitude and width are provided, the higher the frequency, the shorter the interval between them. A thus normalized pulsed signal is directed from line 190 to the input of the fourth stage, 170d, of quad comparator 170. The opposite or negative input to stage 170d receives a reference voltage signal from the reference voltage network represented within boundary 88 and described in conjunction with block 88 in FIG. 2. Network 88 includes resistors R24 within line 188 extending to the input to stage 170d, as well as resistor R25 within line 198 extending between regulated power supply line 182 and line 188. Stage 170d serves to refine the pulse shape of the incoming signal, providing for a sharp rise time characteristic thereof. The stage is shown having a regulated power supply input from line 202 extending to line 182 and set input terminals coupled to ground through lines 202 and 204.

The output of stage 170d is provided at line 206 which extends to the input of a frequency to voltage converter network described in conjunction with block 96 in FIG. 2 and shown within a dashed boundary in FIG. 3B having the same numeration.

Referring to FIG. 3B, the network at 96 is seen to include current limiting resistors R26 and R27 which function in conjunction with a capacitor C5 positioned within line 208 extending to line 206 at a junction 210 between resistors R26 and R27 and ground at line 104. With the arrangement shown, a voltage level is developed at the aforesaid junction 210 which corresponds in value to the frequency of the signal inputted at line 206. The decay rate of capacitor C5 being stable, an increasing pulse frequency will result in the development of higher d.c. levels thereat. This converted voltage level signal then is outputted at earlier-described line 98. To avoid ripple and the like, a capacitor C6 is incorporated within line 204 extending to line 212, which, in turn, is coupled with line 98. Resistor R28 within line 204 serves to provide the earlier-described grounded set input to comparator stage 170d. Note that a test point TP1 is coupled to line 212 and will be seen to serve to monitor the voltage level signal at line 98.

As described earlier herein, the converted voltage level signal at line 98 corresponds with the value of twice the input signal frequency received at the input to circuit 24. This signal then is directed to one input of each of the comparator stages 170a and 170b as above described. Comparator stages 170a and 170b form part of the ring enable comparator function described at block 100 in FIG. 2 and are shown surrounded by dashed boundary 100 in FIG. 3B. With the presentation of the converted voltage level signal from line 98 to one input of each of comparators 170a and 170b, an evaluation may be made as to whether such signal falls within the limits defined for the frequency response selected by manipulation of a selected one of the switches S8-S19. Where such signal falls intermediate these limit values as presented from lines 68 and 162 to the comparator stages, then the outputs of stages 170a and 170b at respective lines 214 and 216 will be a logic high. Output line 214 incorporates a diode D16, while output line 216 incorporates a similar diode D17. As a result, where the noted high conditions representing a valid ring input are present at lines 214 and 216, these diodes are back biased. In consequence, an enabling signal or frequency responsive output is directed to line 214.

Line 214 corresponds with earlier described line 102 (FIG. 2) and extends to network 104 which serves to avoid false triggering phenomena. Network 104 diverts an enabling signal along line 214 to line 218 which incorporates a Zener diode D18 and which is coupled to the base of NPN transistor Q5.

The collector of transistor Q5 is connected to line 220 which extends to provide an enabling input to a ringing tone generator circuit described in conjunction with block 107 in FIG. 2 and shown within dashed boundary 107 in the instant figure. The emitter of transistor Q5 is coupled to ground through line 222. A capacitor C7 is shown coupled within line 214 between ground and diode D17 at line 218. This capacitor C7 functions in conjunction with resistor R29 to provide a short delay, for example of about 100 milliseconds, to assure that the input signal is not a false one.

In the event the input signal level at line 98 does not meet the limit criteria imposed from comparators 170a and 170b, then one or the other or both of the output lines 214 and 216 will assume a logic low condition. As a consequence, the forward bias otherwise provided for turning on transistor Q5 is diverted through one or both of diodes D16 and D17. In effect, diodes D16 and D17 functioning with respect to stages 170a and 170b form an ORing function.

The turning on of transistor Q5 serves to enable the ringing components shown within boundary 107. These components principally are the earlier-described piezoelectric crystal as at 110 or a loudspeaker or the like and an integrated circuit 224 which provides drive for the piezoelectric crystal 110 or the like through line 226. This drive will include a warble frequency as well as an oscillatory component for developing the sound output at speaker 110. Circuit 224 is described in detail in U.S. Pat. No. 4,346,265 issued Aug. 24, 1982, to Buss et al. which is incorporated herein by reference. Enablement of circuit 224 is provided by inputs thereto from along lines 228 and 230, while power input is provided from line 232 extending to power output A earlier-described in connection with voltage limiter function 48 (FIGS. 2 and 3A). Power input to the circuit 224 is provided from line 234 extending to line 232. Note, additionally, that additional parameter control is provided to the circuit 224 through line 236. A resistor R30 within line 220 provides a frequency select function for circuit 224, while a potentiometer as at P3 within line 226 may be utilized for volume control. Of course, mechanical forms of volume control can be used with the sound assembly.

Detector circuit 24, when placed under test, has been found to exhibit a most desired degree of uniformity in performance from unit to unit. This uniformity of performance is important for the large volume applications contemplated for the party line installations of the telephone industry. The circuit is calibrated by electing a nominal frequency, for example 60 Hertz, at network 58. For the embodiment shown, this would be accomplished by closing switch S17 to effect the utilization of resistor R15 with the constant current at line 62. To calibrate the unit with this elected calibrating frequency, a 60 Hertz signal is applied to the tip and ring inputs at lines 26' and 28' and potentiometer P2 is adjusted until the test point TP1 reads, for example, 10 volts. With the design shown, the voltage level at test point 2 (TP2) will be one-half volt in signal level above the elected 10 volts, while the voltage level as introduced from network 60 will be about one-half volt below the level. Tests carried out on a variety of units have shown that with this calibration procedure, a highly desirable uniformity of performance and frequency selection is achieved for any elected frequency response. This uniformity is typified by the test data provided in connection with Table II below. In the table, the voltage readings at test point 1 (TP1), test point 2 (TP2), and the output of the low frequency select reference network 60 for each of four units are revealed. These data show a desirable conformity and uniformity of performance from unit to unit.

TABLE II

| Input Frequency Hz | (TP1) | (TP2) | Low Frequency Select Reference 60 |
|---|---|---|---|
| Unit No. 1 | | | |
| 16.6 | 2.8 | 3.32 | 2.33 |
| 20 | 3.38 | 3.94 | 2.93 |
| 25 | 4.2 | 4.72 | 3.7 |
| 30 | 5.02 | 5.6 | 4.56 |
| 33.3 | 5.57 | 6.14 | 5.1 |
| 40 | 6.69 | 7.19 | 6.14 |
| 42 | 7.02 | 7.69 | 6.63 |
| 50 | 8.36 | 8.88 | 7.82 |
| 54 | 9.03 | 9.49 | 8.42 |
| 60 | 10.04 | 10.66 | 9.6 |
| 66 | 11.04 | 11.64 | 10.57 |
| 66.6 | 11.17 | 11.604 | 10.54 |
| Unit No. 2 | | | |
| 16.6 | 2.82 | 3.37 | 2.38 |
| 20 | 3.39 | 4.03 | 3.02 |
| 25 | 4.21 | 4.82 | 3.8 |
| 30 | 5.03 | 5.7 | 4.67 |
| 33.3 | 5.59 | 6.27 | 5.24 |
| 40 | 6.7 | 7.3 | 6.25 |
| 42 | 7.04 | 7.86 | 6.81 |
| 50 | 8.37 | 9.12 | 8.06 |
| 54 | 9.05 | 9.75 | 8.69 |
| 60 | 10.06 | 10.67 | 9.61 |
| 66 | 11.05 | 11.87 | 10.81 |
| 66.6 | 11.18 | 11.92 | 10.85 |
| Unit No. 3 | | | |
| 16.6 | 2.82 | 3.36 | 2.36 |
| 20 | 3.4 | 3.96 | 2.95 |
| 25 | 4.23 | 4.79 | 3.76 |
| 30 | 5.06 | 5.64 | 4.6 |
| 33.3 | 5.61 | 6.21 | 5.17 |
| 40 | 6.73 | 7.26 | 6.21 |
| 42 | 7.07 | 7.75 | 6.7 |
| 50 | 8.42 | 8.97 | 7.91 |
| 54 | 9.09 | 9.62 | 8.56 |
| 60 | 10.06 | 10.64 | 9.57 |
| 66 | 11.1 | 11.8 | 10.73 |
| 66.6 | 11.23 | 11.81 | 10.74 |
| Unit No. 4 | | | |
| 16.6 | 2.8 | 3.36 | 2.36 |
| 20 | 3.38 | 3.98 | 2.96 |
| 25 | 4.21 | 4.77 | 3.74 |
| 30 | 5.04 | 5.66 | 4.62 |
| 33.3 | 5.59 | 6.22 | 5.17 |
| 40 | 6.71 | 7.25 | 6.19 |
| 42 | 7.05 | 7.81 | 6.75 |
| 50 | 8.39 | 9.00 | 7.92 |
| 54 | 9.07 | 9.65 | 8.58 |
| 60 | 10.0 | 10.7 | 9.6 |
| 66 | 11.08 | 11.8 | 10.73 |
| 66.6 | 11.21 | 11.84 | 10.77 |

As indicated earlier herein, the circuit 24 advantageously exhibits a low load characteristic such that it may be employed to enhance the number of telephone sets with ringers which may be used in a given party line design. Referring to Table III below, the ringer power demand for mechanical type telephone ringers in a five-party line with one ringer per party are set forth. The mechanical ringers tested are currently available to the industry and are identified as SC and ITT. Because the voltages at the signal input to the telephone lines vary, the table also includes the value of RMS voltage of those inputs under which the testing took place. It may be noted that this voltage variation ranges from 105 v. to 140 v. The tabulation further includes the identification, S, referring to synchromonic series ringing systems; a designation, D, for decimonic ringing systems and a designation, H, representing tests carried out with a harmonic series ringing system.

TABLE III

| | | Ringer Power Demand-Watts | | | | | | | | | | | |
|---|---|---|---|---|---|---|---|---|---|---|---|---|---|
| Ser. | Mfgr. | 16 Hz 105 v. | 16.6 Hz 105 v. | 20 Hz 105 v. | 25 Hz 110 v. | 30 Hz 110 v. | 33.3 Hz 115 v. | 40 Hz 115 v. | 42 Hz 115 v. | 50 Hz 125 v. | 54 Hz 125 v. | 60 Hz 140 v. | 66 Hz 140 v. | 66.6 Hz 140 v. |
| S | SC | | | 2.269 | | 4.081 | | | 4.865 | | 5.590 | | 5.866 | |
| | ITT | | | 1.975 | | 4.191 | | | 6.993 | | 9.051 | | 10.850 | |
| D | SC | | | 2.480 | | 4.543 | | 5.211 | | 4.976 | | 5.852 | | |
| | ITT | | | 1.996 | | 4.224 | | 6.912 | | 8.649 | | 10.962 | | |
| H | SC | | 1.734 | | 3.311 | | 4.853 | | | 4.864 | | | | 5.460 |
| | ITT | | 1.964 | | 4.213 | | 7.521 | | | 8.526 | | | | 9.016 |

Table IV shows the results of testing circuit 24 for the three ringing series identified as S, D and H and for the various frequency and voltage levels as labeled. It may be observed that the circuit 24 enjoys the aspect of lower power demand (watts).

TABLE IV

| | Ringer Power Demand-Watts | | | | | | | | | | | |
|---|---|---|---|---|---|---|---|---|---|---|---|---|
| Ser. | 16.6 Hz 90 v. | 20 Hz 105 v. | 25 Hz 110 v. | 30 Hz 110 v. | 33.3 Hz 110 v. | 40 Hz 115 v. | 42 Hz 115 v. | 50 Hz 125 v. | 54 Hz 125 v. | 60 Hz 140 v. | 66 Hz 140 v. | 66.6 Hz 140 v. |
| S | | 1.68 | | 1.93 | | | 2.153 | | 2.49 | | 2.97 | |
| D | | 1.68 | | 1.93 | | 2.13 | | 2.45 | | 2.894 | | |
| H | 1.35 | | 1.87 | | 1.97 | | | 2.45 | | | | 2.97 |

Since certain changes may be made in the above system and apparatus without departing from the scope of the invention herein involved, it is intended that all matter contained in the above description or shown in the accompanying drawings shall be interpreted as illustrative and not in a limiting sense.

I claim:

1. A detector circuit for deriving a predetermined output response to a signal input of predesignated frequency, comprising:

signal treatment means responsive to said signal input for providing a substantially constant current output;

frequency select network means responsive to said constant current output, adjustable in correspondence with said predesignated frequency for deriving first and second voltage level signals respectively representing frequency values above and below said predesignated frequency;

converter network means responsive to said signal input for deriving a converted voltage level signal corresponding therewith; and comparator means responsive to said first and second voltage level signals for deriving a frequency identification output when said converted voltage level signal is of value intermediate the values of said first and second voltage level signals.

2. The detector circuit of claim 1 in which said frequency select network means comprises:

a high frequency select reference network including a plurality of resistors, each having a predetermined resistance value corresponding with a said predesignated frequency;

switch means for selectively coupling a said resistor with said signal treatment means constant current output for deriving said first voltage level signal.

3. The detector circuit of claim 2 in which said frequency select network means further includes a low frequency select reference network responsive to said first voltage level signal and including impedance means for driving said second voltage level therefrom.

4. The detector circuit of claim 1 in which said comparator means comprises:

first and second comparator stages, said first comparator stage being responsive to said first voltage level signal and said converted voltage level signal and having a first output when said first voltage level signal is of higher magnitude than said converted voltage level signal, said second comparator stage being responsive to said second voltage level signal and to said converted voltage level signal and having a second output when said second voltage level signal is of lower magnitude than said converted voltage level signal; and logic network means responsive only to the presence of said first and second outputs for deriving said frequency identification output.

5. The detector circuit of claim 1 further comprising:

an audibly perceptible transducer signaler;

driver circuit means responsive to an enabling input for driving said signaler; and delay network means responsive to said frequency identification output for deriving said enabling input following a predetermined delay interval.

6. The detector circuit of claim 1 in which said converter network means comprises:

frequency doubling means for deriving a first signal having a frequency substantially double that of said signal input;

constant pulse duration converter means responsive to said first signal for deriving a second signal exhibiting substantially constant pulse duration; and frequency to voltage converter means responsive to said second signal for deriving said converted voltage level in correspondence with the frequency of pulses of said second signal.

7. The detector circuit of claim 1 in which said signal treatment means comprises:

rectifier means including a full wave bridge for receiving said signal input and deriving a rectified signal;

regulator network means responsive to said rectified signal for deriving a substantially stable voltage output of predetermined magnitude; and constant current network means responsive to said stable voltage output for deriving said constant current output.

8. The detector circuit of claim 7 in which said converter network means comprises:

frequency doubling means including a comparator stage coupled with said full wave bridge for deriving a first signal having a frequency substantially double that of said signal input;

constant pulse duration converter means responsive to said first signal for deriving a second signal exhibiting substantially constant pulse duration; and frequency to voltage converter means responsive to said second signal for deriving said converted voltage level in correspondence with the frequency of said second signal.

9. The detector circuit of claim 8 in which said frequency select network means comprises:

a high frequency select reference network including a plurality of resistors, each having a predetermined resistance value corresponding with a said predesignated frequency;

switch means for selectively coupling a said resistor with said signal treatment means constant current output for deriving said first voltage level signal.

10. The detector circuit of claim 9 in which said frequency select network means further includes a low frequency select reference network responsive to said first voltage level signal and including impedance means for deriving said second voltage level therefrom.

11. The detector circuit of claim 9 in which said comparator means comprises:

first and second comparator stages, said first comparator stage being responsive to said first voltage level signal and said converted voltage level signal and having a first output when said first voltage level signal is of higher magnitude than said converted voltage level signal, said second comparator stage being responsive to said second voltage level signal and to said converted voltage level signal and having a second output when said second voltage level signal is of lower magnitude than said converted voltage level signal; and logic network means responsive only to the presence of said first and second outputs for deriving said frequency identification output.

12. A frequency selective ringer circuit for deriving an output in response to a signal input of predesignated ring frequency, comprising:

rectifier means for receiving said signal input and deriving a rectified signal;

frequency doubling means coupled with said rectifier means for deriving a first signal having a frequency substantially double that of said signal input;

first converter means responsive to said first signal for deriving a second signal exhibiting substantially constant pulse duration;

second converter means responsive to said second signal for deriving a converted voltage level signal corresponding with the frequency of said second signal;

signal treatment means responsive to said rectified signal for providing a substantially constant current output;

frequency select network means responsive to said constant current output and adjustable in correspondence with said predesignated frequency for deriving first and second voltage level signals defining frequency value limits respectively above and below said predesignated frequency; and comparator means responsive to said first, second and converted voltage level signals for deriving a frequency responsive output when said converted voltage level signal is of value intermediate the limit values of said first and second voltage level signals.

13. The frequency selective ringer circuit of claim 12 in which:

said rectifier means includes a full wave rectifier having two alternate half-cycle legs;

said frequency doubling means includes:

summing network means coupled with each said half cycle legs for deriving a frequency doubled output;

reference network means for providing a first reference signal;

comparator means responsive to said first reference signal and said frequency doubled output for deriving said first signal.

14. The frequency selective ringer circuit of claim 13 in which each said rectifier half-cycle leg includes diode means for causing each half cycle voltage component of said frequency doubled output to remain at least a predetermined level above its zero crossover.

15. The frequency selective ringer circuit of claim 13 in which said first converter means comprises a differentiating network for deriving said second signal as a train of pulses of substantially constant pulses width and amplitude.

16. The frequency selective ringer circuit of claim 15 in which:

said first converter means includes impedance adjustment means manually adjustable to vary the width of said pulses derived by said differentiating network; and said second converter means includes a test position for determining the instantaneous value of said converted voltage level signal.

17. The frequency selective ringer circuit of claim 15 in which said frequency select network means comprises:

a high frequency select reference network including a plurality of resistors, each having a predetermined resistance value corresponding with a said predesignated frequency; and switch means for selectively coupling a said resistor with said signal treatment means constant current output for deriving said first voltage level signal.

18. The frequency selective ringer circuit of claim 17 in which said frequency select network means further includes a low frequency select reference network responsive to said first voltage level signal and including impedance means for deriving said second voltage level therefrom.

19. The frequency selective ringer circuit of claim 15 in which said comparator means comprises:

first and second comparator stages, said first comparator stage being responsive to said first voltage level signal and said converter voltage level signal and having a first output when said first voltage level signal is of higher magnitude than said converted voltage level signal, said second comparator stage being responsive to said second voltage level signal and to said converted voltage level signal and having a second output when said second voltage level signal is of lower magnitude than said converted voltage level signal; and logic network means responsive only to the presence of said first and second outputs for deriving said frequency identification output.

20. A frequency selective ringer circuit for use in conjunction with telephone sets responsive to a signal input of predesignated frequency and having connections to a capacitor containing mechanical bell ringer circuit, comprising:

first rectifier means responsive to said signal input and connectible with said mechanical bell ringer circuit connections for effecting the disablement thereof by the charging of said capacitor;

signal treatment means including second rectifier means and responsive to said signal input for providing a substantially constant current output;

frequency select network means responsive to said constant current output and adjustable in correspondence with said predesignated frequency for deriving first and second voltage level signals defining frequency value limits respectively above and below said predesignated frequency;

frequency doubling means coupled with said second rectifier means for deriving a first signal having a frequency substantially double that of said signal input;

first converter network means responsive to said first signal for deriving a second signal exhibiting substantially constant pulse duration;

second converter means responsive to said second signal for deriving a converted voltage level signal corresponding with the frequency of said second signal;

comparator means responsive to said first, second and converted voltage level signals for deriving a frequency responsive output when said converted voltage level signal is of value intermediate the limit values of said first and second voltage level signals;

an audio transducer energizable to produce an audible signal; and circuit means responsive to said frequency responsive output for effecting the energization of said audio transducer.

* * * * *